(12) United States Patent
Huang (10) Patent No.: US 8,393,018 B2
(45) Date of Patent: Mar. 12, 2013

(54) DUAL-FLUSH TOILET DEVICE

(76) Inventor: Somei Huang, Tai Ping (TW)

( * ) Notice: Subject to any disclaimer, the term of this patent is extended or adjusted under 35 U.S.C. 154(b) by 224 days.

(21) Appl. No.: 13/064,276

(22) Filed: Mar. 16, 2011

(65) Prior Publication Data
US 2012/0233759 A1 Sep. 20, 2012

(51) Int. Cl.
*E03D 1/14* (2006.01)
(52) U.S. Cl. .............................. 4/324; 4/405
(58) Field of Classification Search .............. 4/324, 405, 4/412, 415
See application file for complete search history.

(56) References Cited

U.S. PATENT DOCUMENTS
2010/0132104 A1* 6/2010 Csiki .................................. 4/324
2011/0167549 A1* 7/2011 Schuster et al. .................. 4/324

* cited by examiner

*Primary Examiner* — Tuan N Nguyen
(74) *Attorney, Agent, or Firm* — Guice Patents PLLC (57) ABSTRACT

The present invention discloses a dual-flush toilet device including an outer casing, a gear set, a ring disk set, a connecting rod set and a drive set. The drive set includes a first toilet flushing handle and a second toilet flushing handle. By pressing the first and the second toilet flushing handle, the discharged water amount can be controlled accurately and thereby achieves the goal of water saving.

9 Claims, 15 Drawing Sheets

DUAL-FLUSH TOILET DEVICE

BACKGROUND OF THE INVENTION

1. Field of the Invention

The present invention relates to a dual-flush toilet device; and more particularly to a dual-flush toilet device that is capable of controlling and saving water thereof and is commonly applicable to all kinds of toilet cisterns.

2. Brief Description of the Related Art

Figure 1:
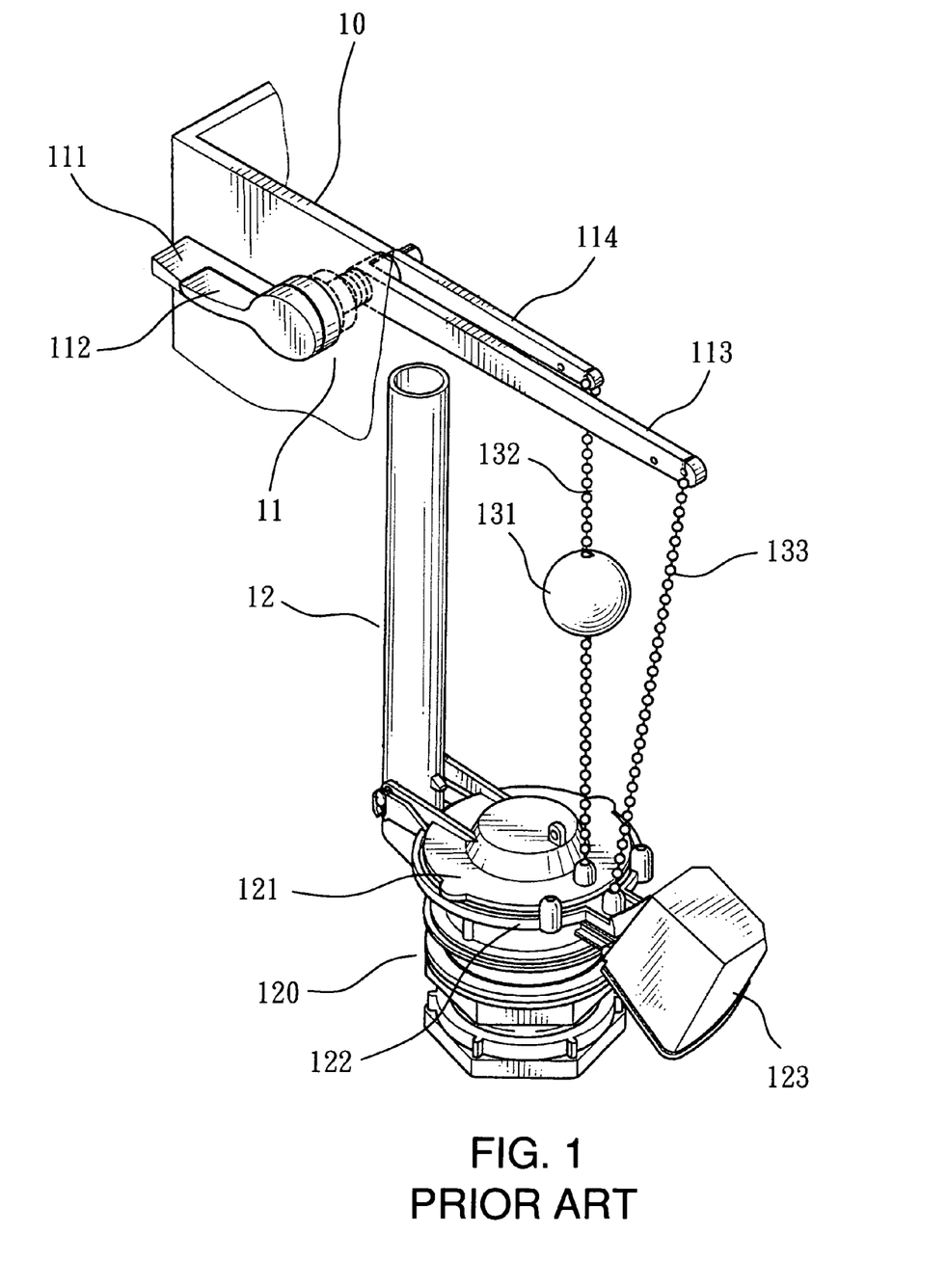
FIG. 1 is a perspective view illustrating the prior art.

FIG. 1 illustrates the existing dual-flush toilet device, wherein a toilet flushing handle set 11 is disposed at lateral surface of a toilet cistern 10. The toilet flushing handle set 11 comprises a first toilet flushing handle 111 and a second toilet flushing handle 112, wherein the first toilet flushing handle 111 links up with a first connecting rod 113. One end of the first connecting rod 113 is attached to an end of a first chain 133, wherein the other end of the first chain 133 is attached to a lower valve body 122. The lower valve body 122 is disposed on top of a flush valve 120 of an overflow tube 12 and the front side thereof is connected to an auxiliary float body 123. The second toilet flushing handle 112 links up with a second connecting rod 114, wherein one end of the second connecting rod 114 is attached to an end of a second chain 132; and the other end of the second chain 132 is attached to an upper valve body 121 that is disposed on top of the lower valve body 122. The second chain 132 is further disposed of a small float ball 131. When flushing stool, press the first toilet flushing handle 111 to lift the lower valve body 122 and discharge water; since the auxiliary float body 123 positioned in front of the lower valve body 122 has a large volume, the time required for the lower valve body 122 to cover up the flush valve 120 is longer and the discharged water amount is therefore larger. When flushing urine, press the second toilet flushing handle 112 to lift the upper valve body 121 and discharge water; since the small float ball 131 is of small volume, the time required for the upper valve body 121 to cover up the lower valve body 122 is shorter and therefore the discharged water amount is smaller.

The foregoing prior arts of the dual-flush toilet device (hereinafter the prior arts) are of the following deficiencies:
1. The first and second connecting rods 113 and 114 of different kinds of toilet cisterns are of different pressing angles, therefore the repair parts are not commonly applicable. When the original model's production stops, it has to be replaced by a repair part of different model or different brand, and the water discharge amount is hence inaccurate.
2. The first and second connecting rods 113 and 114 are capable of controlling the water discharge amount; however, the using of the small float ball 131 and the auxiliary float body 123 of the prior art to control water discharge amount is actually not accurate due to the swaying movement of the small float ball 131 and the auxiliary float body 123 caused by the water flow in the toilet cistern 10.

SUMMARY OF THE INVENTION

In order to overcome the deficiencies of the prior art, a primary object of the present invention is to provide a dual-flush toilet device that is capable of controlling and saving water thereof and is commonly applicable to all kinds of toilet cisterns.

With the above object in mind, the dual-flush toilet device of the present invention comprises an outer casing, a gear set, a ring disk set, a connecting rod set and a drive set; wherein the drive set comprises a first toilet flushing handle and a second toilet flushing handle. By pressing the first and the second toilet flushing handle, the discharged water amount can be controlled accurately and thereby achieves the goal of water saving.

The outer casing is disposed of a ventilation set comprising an air cell disposed in a first casing body thereof, a control valve, a connecting base and an air duct. The drive set is comprised of a first toilet flushing handle, a second toilet flushing handle, a fixing axle cover, a drive rod, a cistern fixing nut and a fixing rotate screw. The connecting rod set is comprised of a connecting rod head having a connecting rod, a driving wheel and a stop seat.

BRIEF DESCRIPTION OF THE INVENTION

The detail structure, the applied principle, the function and the effectiveness of the present invention can be more fully understood with reference to the following description and accompanying drawings, in which:

FIG. 3-1 is a perspective view of the first casing body according to the present invention;

FIG. 3-2 is a perspective view of the second casing body according to the present invention;

DETAILED DESCRIPTION OF THE PREFERRED EMBODIMENTS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 31:
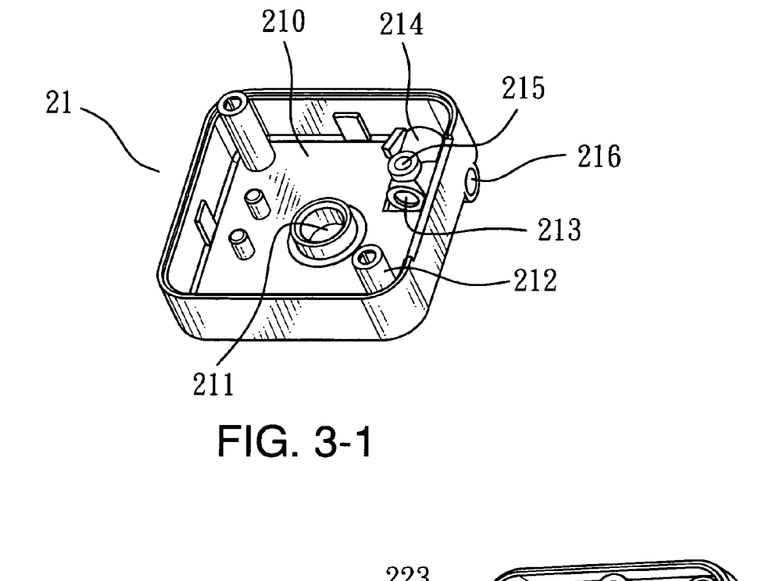
Figure 32:
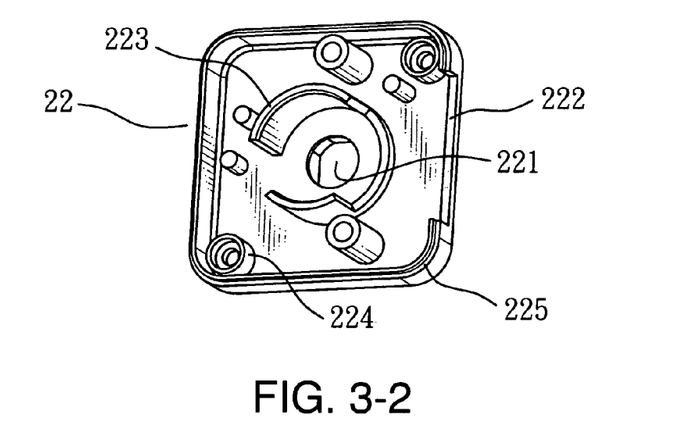

Please refer to FIGS. 3-1 and 3-2, wherein the outer casing 2 is comprised of a first casing body 21 and a second casing body 22. The first casing body 21 has a receiving space 210, and a plurality of fixing studs 212 is disposed therein. A first axle hole 211 penetrates the center of the first casing body 21. The second casing body 22 is disposed of a second axle hole 221 and a plurality of fixing hole columns 224 at the inner surface thereof. At least one arc-shaped retaining wall is disposed to surround the outer edge of the second axle hole 221, and the fixing hole columns 224 correspondingly fit with the fixing studs 212 to allow a bolt C to screw lock thereon. One of the lateral surface 225 of the second casing body 22 is disposed of a notch 222.

Figure 2:
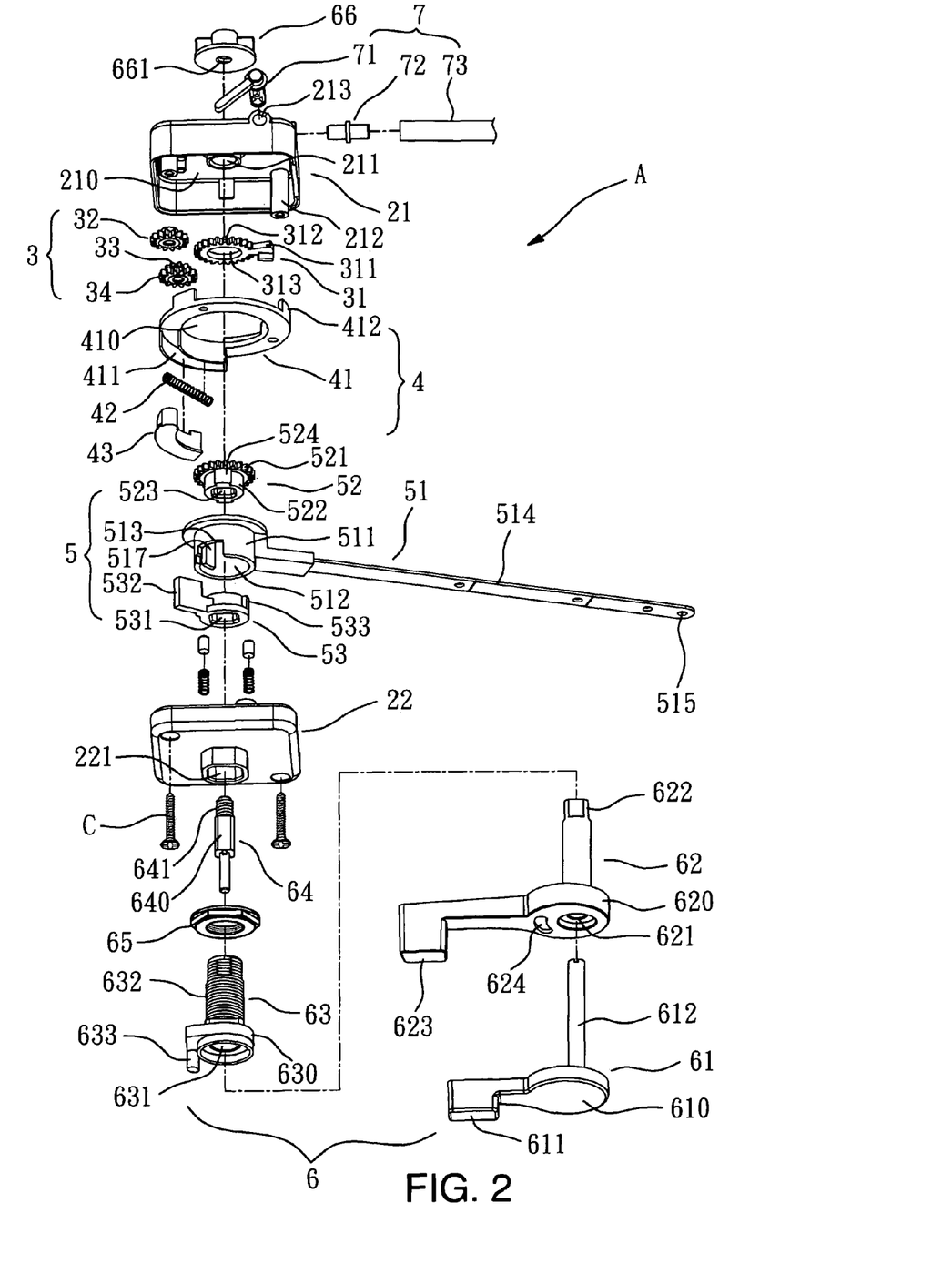
FIG. 2 is an exploded perspective view according to the present invention.
Figure 4:
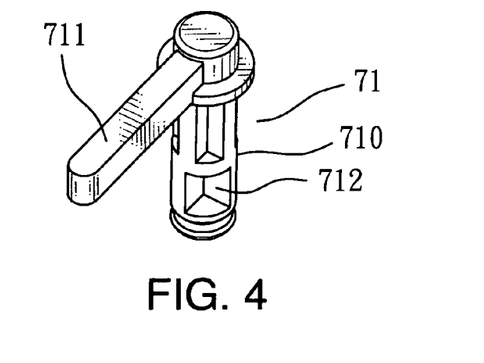
FIG. 4 is a perspective view of the control valve according to the present invention.

The gear set 3 comprises:
- a first gear 31 having a pushing piece 311 that extends from a side of a gear 312, and the first gear 31 further comprises a third axle hole 313;
- a second gear 32 meshing with the first gear 31;
- a third gear 33 meshing with the second gear 32; and
- a fourth gear 34 coaxially linking up with the third gear 33.

Figure 8:
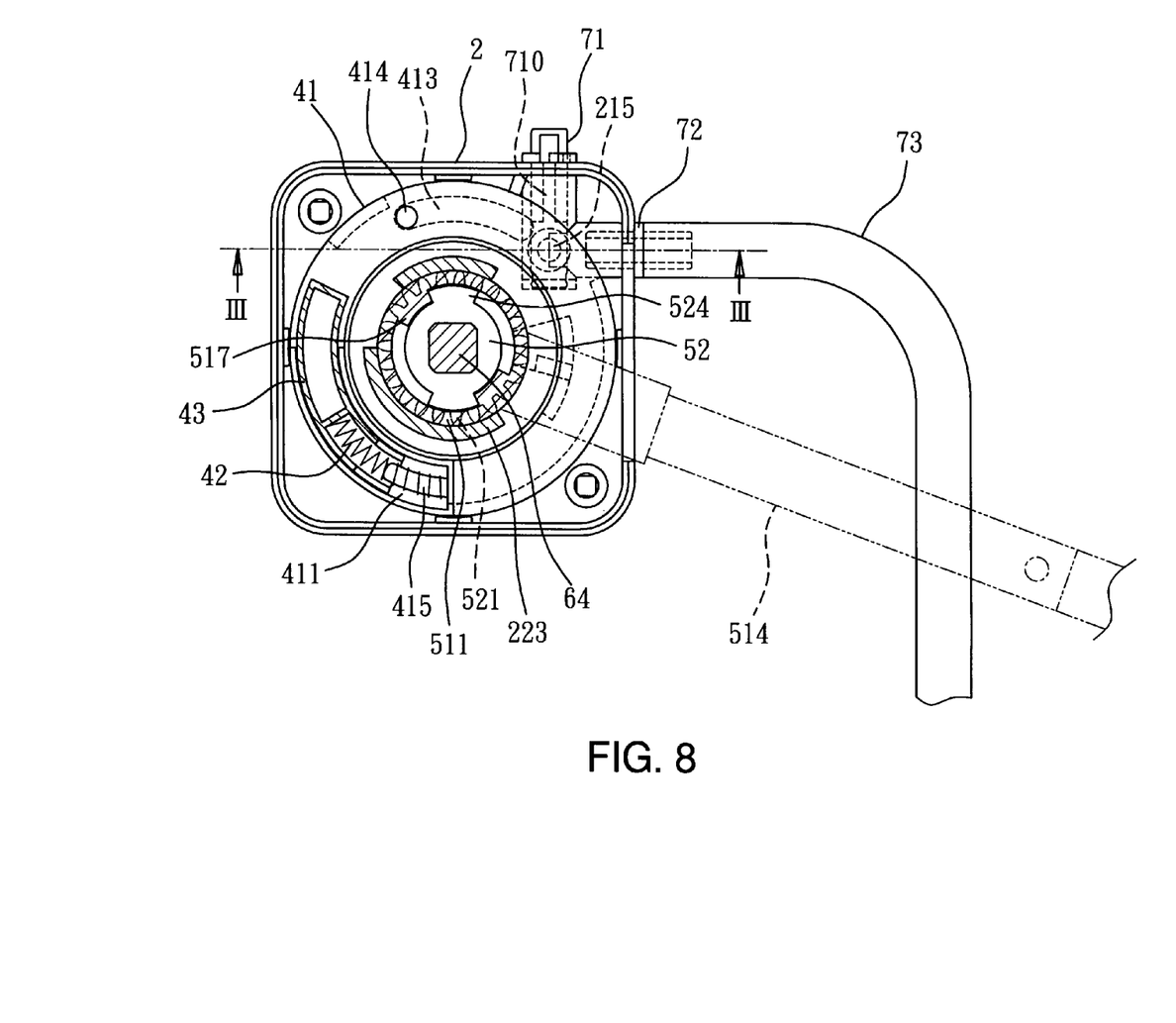
FIG. 8 is the first I-I sectional view according to the present invention.

The ring disk set 4 comprising:
- a ring disk body 41 having a rounded hole 410, wherein a plurality of supporting pieces 412 are disposed along the periphery edge of the ring disk body 41 and an arc-shaped groove 413 is disposed at the bottom lateral surface of the ring disk body 41, with an air hole 414 disposed thereon, as illustrated in FIG. 8; further, an arc-shaped chamber 411 is provided at the top surface of the ring disk body 41, wherein a fixing column 415 is convexly disposed at one side of the arc-shaped chamber 411;
- a spring 42 fitting with the fixing column 415; and
- an arc-shaped pushing seat 43 disposed inside the arc-shaped chamber 411 and being pushed by the spring 42.

Figure 7:
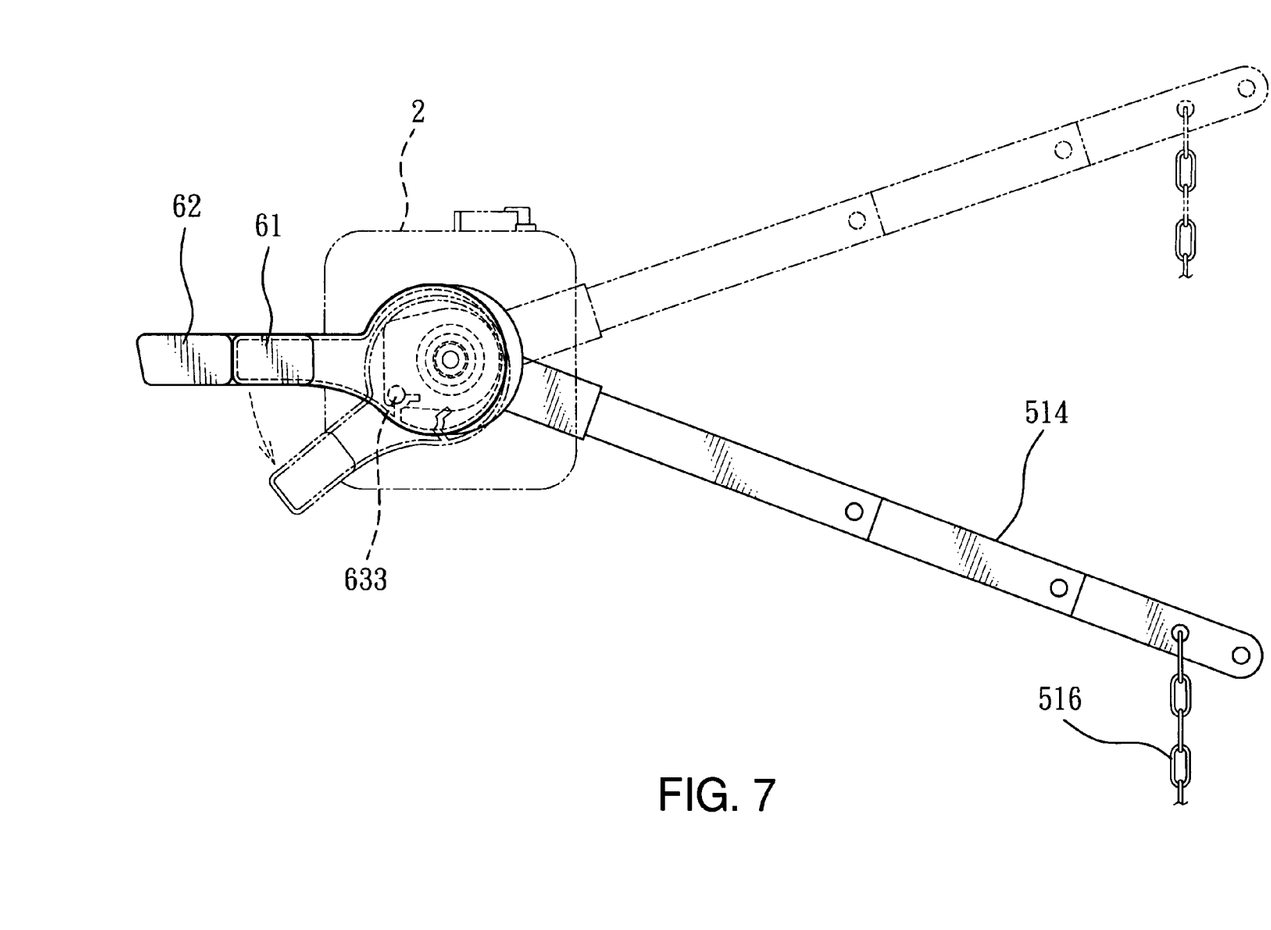
FIG. 7 is a schematic representation of urine-flushing operation according to the present invention.

The connecting rod set 5 comprising:
- a connecting rod head 51 comprising a connecting rod 514 extends from the periphery edge of a rounded main body 511, wherein a plurality of hanging holes 515 is disposed at the connecting rod 514 to allow hanging of a chain 516 as illustrated in FIG. 7; the rounded main body 511 further comprises a fourth axle hole 512 and a notch 513, wherein at least one first convex rib 517 is disposed on the inner wall of the fourth axle hole 512;
- a driving wheel 52 having a polygon hole 523; one side of the driving wheel 52 is disposed of a gear part 521 and the other side of the driving wheel 52 is a rounded body 522, wherein at least one second convex rib 524 is provided along the periphery edge of the rounded body 522; and
- a stop seat 53 having a polygon hole 531, wherein a stop piece 532 and at least one third convex rib 533 are disposed along the periphery edge of the stop seat 53.

The drive set 6 comprising:
- a first toilet flushing handle 61, wherein a handle body 611 extends from the periphery edge of a plate body 610, and a first rod body 612 extends from the center of the plate body 610;
- a second toilet flushing handle 62, wherein a handle body 623 extends from the periphery edge of a plate body 620 and an axle hole 621 penetrates the center of the plate body 620 thereof to allow the insertion of the first rod body 612; a second rod body 622 having a polygon end extends from the outer wall of the axle hole 621 of one side of the plate body 620, wherein an arc-shaped groove 624 is disposed near the axle hole 621 on the plate body 620;
- a fixing axle cover 63 having an axle hole 631 penetrating the center thereof to allow insertion of the second rod body 622; one side of the fixing axle cover 63 provides a cylinder 630, one side of the fixing axle cover 63 provides a position-limiting column 633, and the other side of the fixing axle cover 63 has an external thread section 632;
- a drive rod 64 having an external thread section 641 at one end thereof; the middle section of the drive rod 64 is a polygon rod body 640, and the other end of the drive rod 64 links to the first rod body 612;
- a cistern fixing nut 65 screw locked to the external thread section 632 of the fixing axle cover 63; and
- a fixing rotate screw 66 having an inner thread hole 661 to allow screw locking with the external thread section 641 of the drive rod 64.

The outer casing 2 of the dual-flush toilet device A further comprises a ventilation set 7 as illustrated in FIGS. 3-1, 4 and 14. The ventilation set 7 comprises:
- an air cell 214 disposed in the first casing body 21, wherein the air cell 214 has a valve hole 213 to receive a control valve 71, and is further disposed of a first through hole 215 and a second through hole 216 that are in connection to the valve hole 213;
- the control valve 71 having a control handle 711 extending from the upper end thereof, and at least one notch 712 is concavely disposed at a valve body 710;
- a connecting base 72 having a hollow through hole 721, wherein one end of the connecting base 72 fits with the second through hole 216 and the other end of the connecting base 72 fits with an end of an air duct 73; and
- the air duct 73; the other end thereof is connected to an air connector 931 of a valve body 93 that covers a flush valve 92 as illustrated in FIG. 5.

Figure 5:
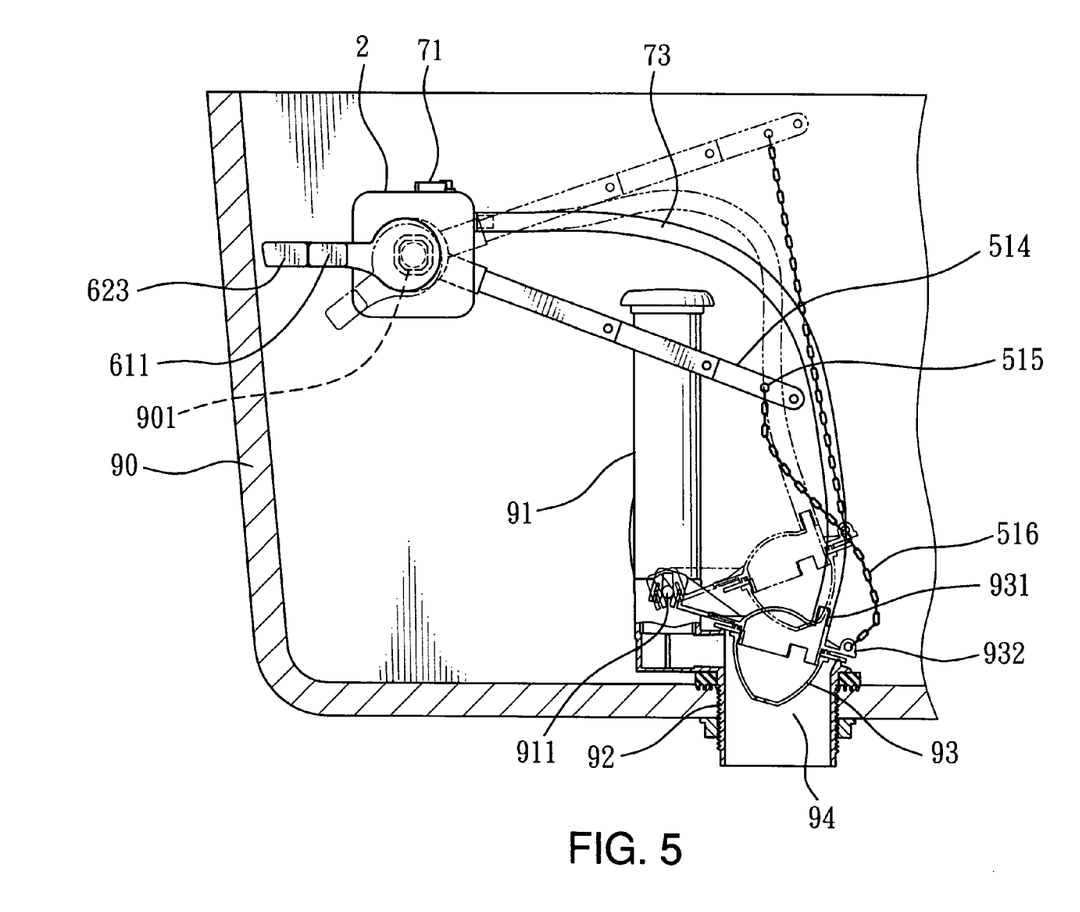
FIG. 5 illustrates an embodiment according to the present invention.
Figure 6:
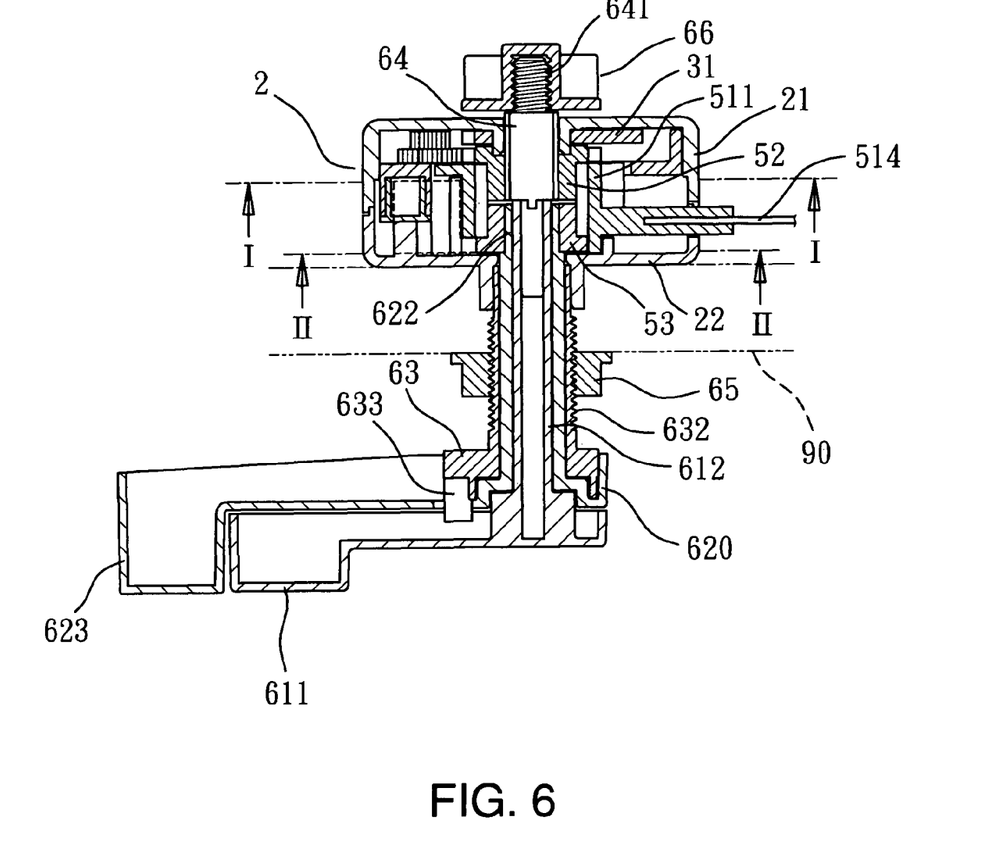
FIG. 6 is a sectional view according to the present invention.

Referring to FIGS. 5 and 6, the dual-flush toilet device A assembled by the foregoing assemblies can be installed to a toilet cistern 90 at a pivot hole 90 thereon; hang one end of the chain 516 on the hanging hole 515 of the connecting rod 514, and the other end of the chain 516 on a hanging part 932 of a valve body 93. One side of the valve body 93 suspends on a suspension part 911 of an overflow tube 91, and the valve body 93 covers a water outlet 94 of the flush valve 92.

Figure 9:
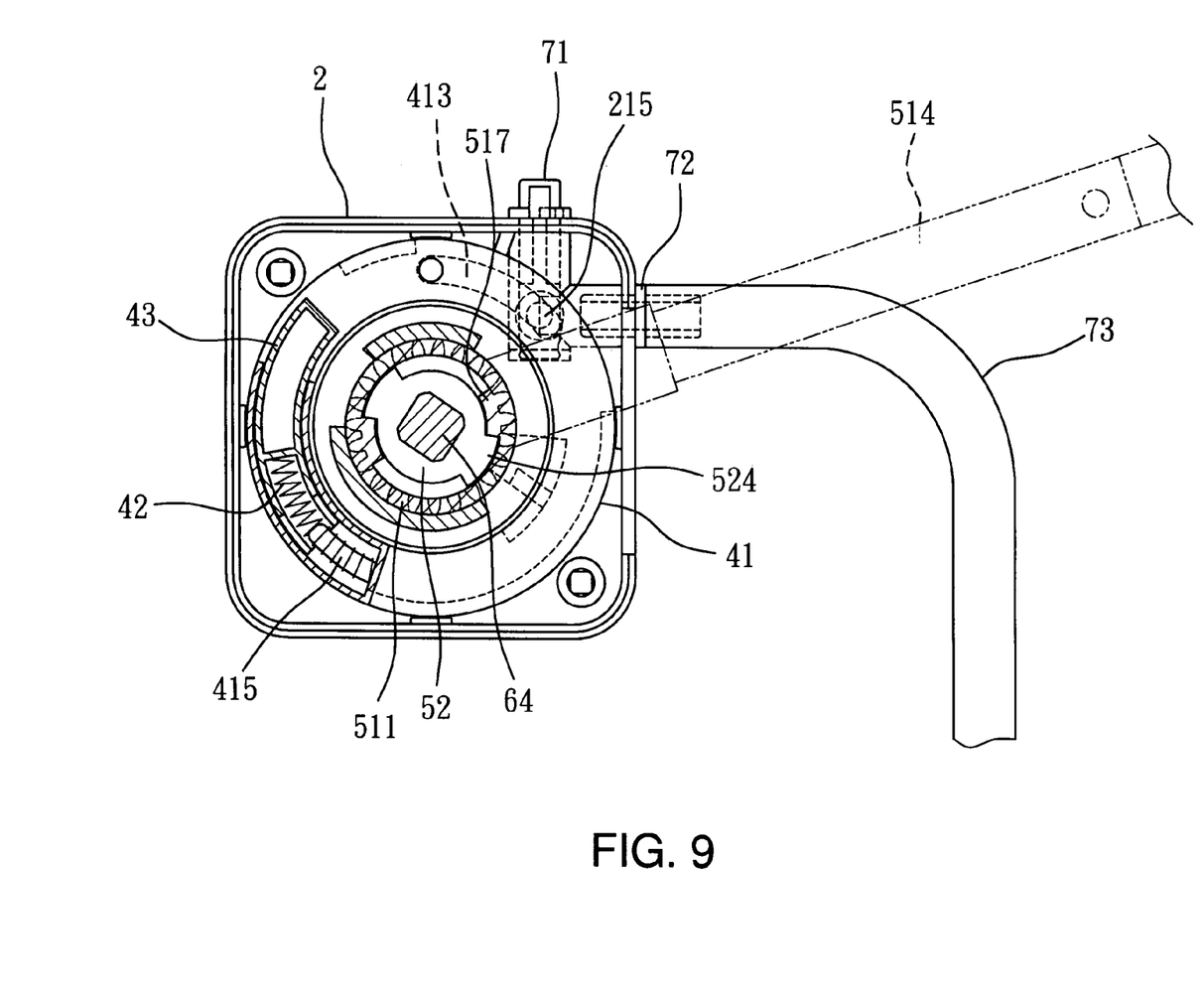
FIG. 9 is the second I-I sectional view according to the present invention.
Figure 10:
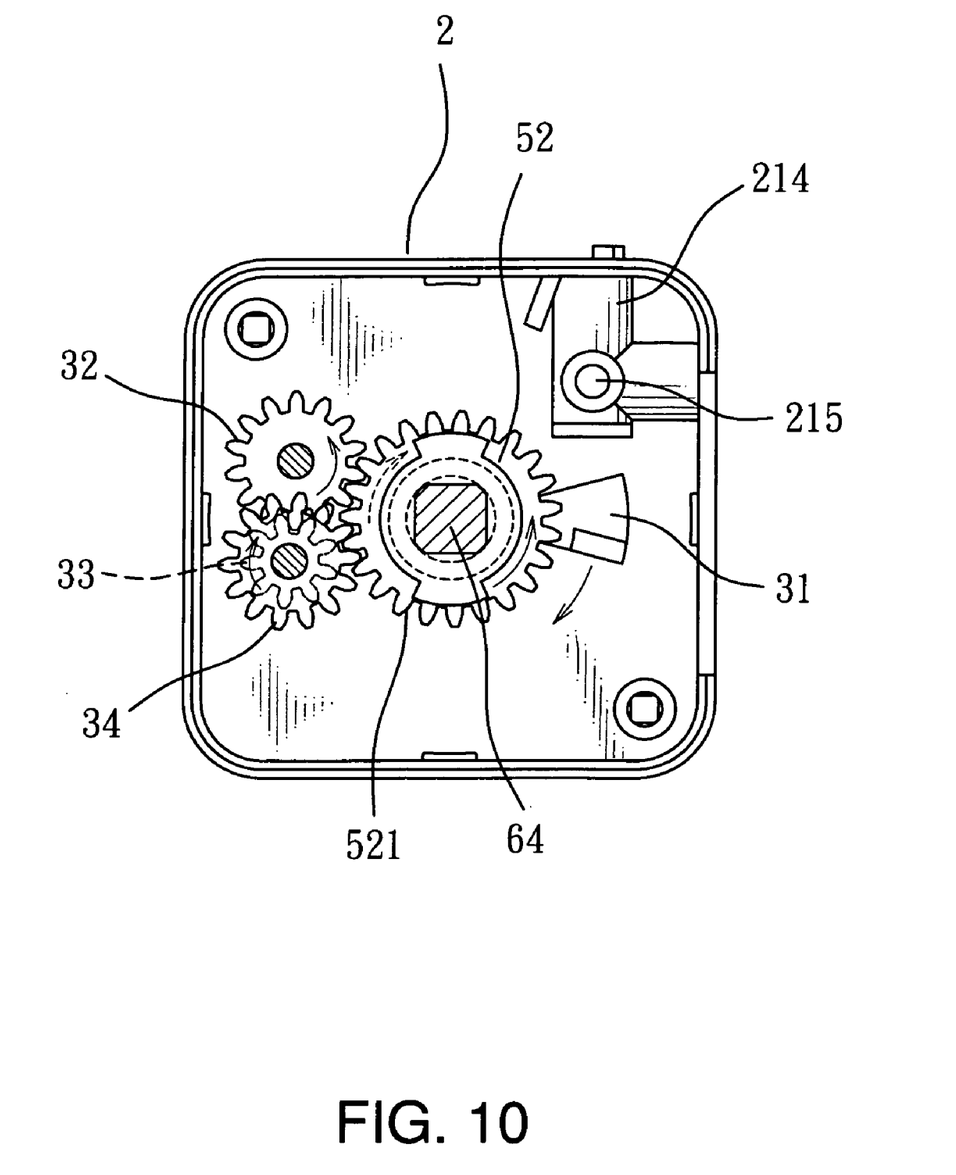
FIG. 10 is a schematic representation of urine-flushing actuation according to the present invention.

With reference to FIGS. 7, 8 and 9; when flushing urine, the user should press the first toilet flushing handle 61. As the first toilet flushing handle 61 is pressed downwards (please also refer to FIG. 10,) the drive rod 64 links up with the driving wheel 52, the gear part 521 meshes with and actuates the fourth gear 34, the fourth gear 34 rotates and coaxially actuates the third gear 33, the third gear 33 meshes with and actuates the second gear 32, the second gear 32 meshes with and actuates the first gear 31. By the foregoing method a decelerate effect is achieved and the second convex rib 524 of the rounded body 522 of the driving wheel 52 fits with the first convex rib 517 in order to allow the rotation of the connecting rod head 51, thereby control the speed of the connecting rod 514 lifting the valve body 94 to prevent it from moving too fast, and hence the discharged water amount can be smaller.

Figure 11:
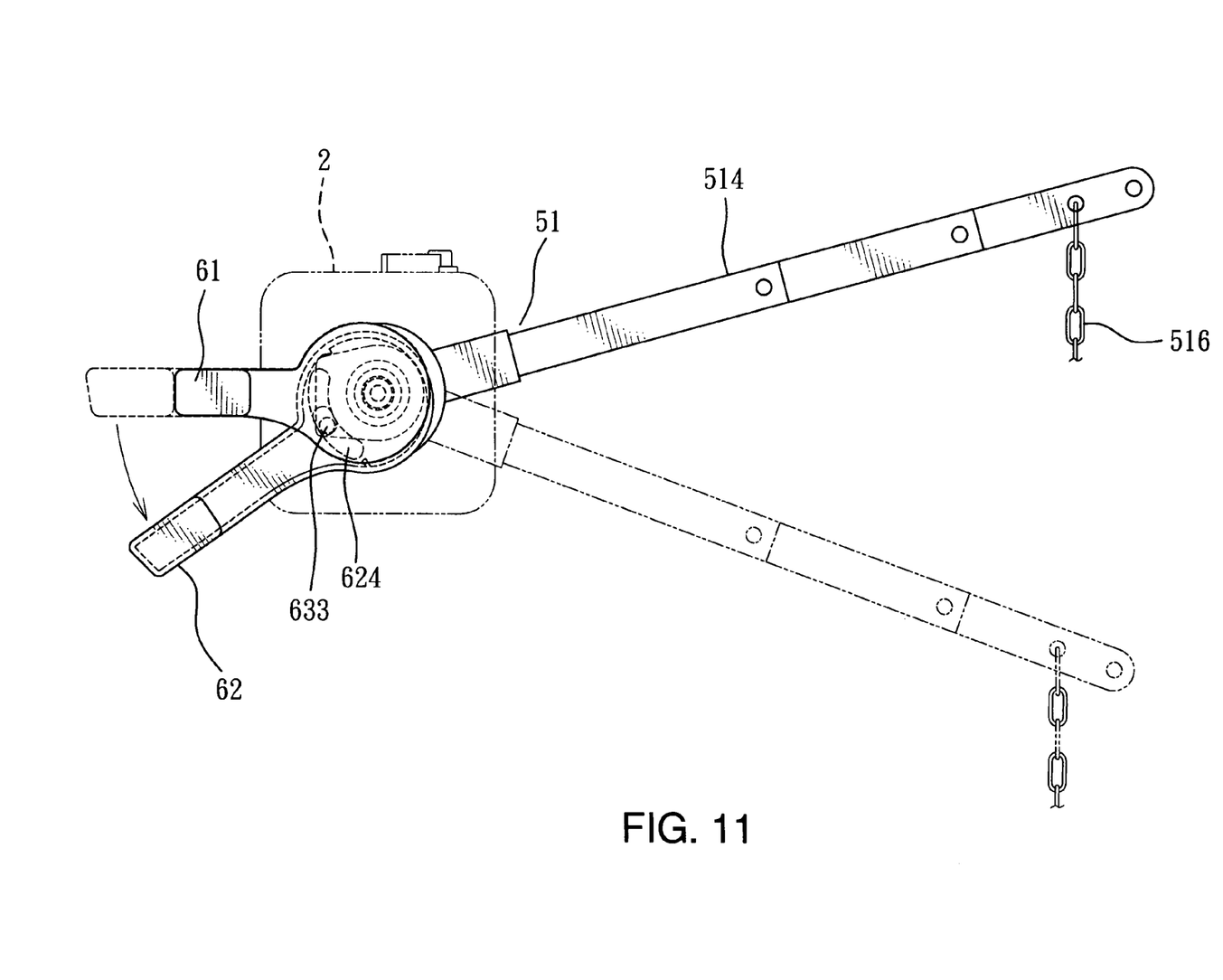
FIG. 11 is a schematic representation of stool-flushing operation according to the present invention.
Figure 12:
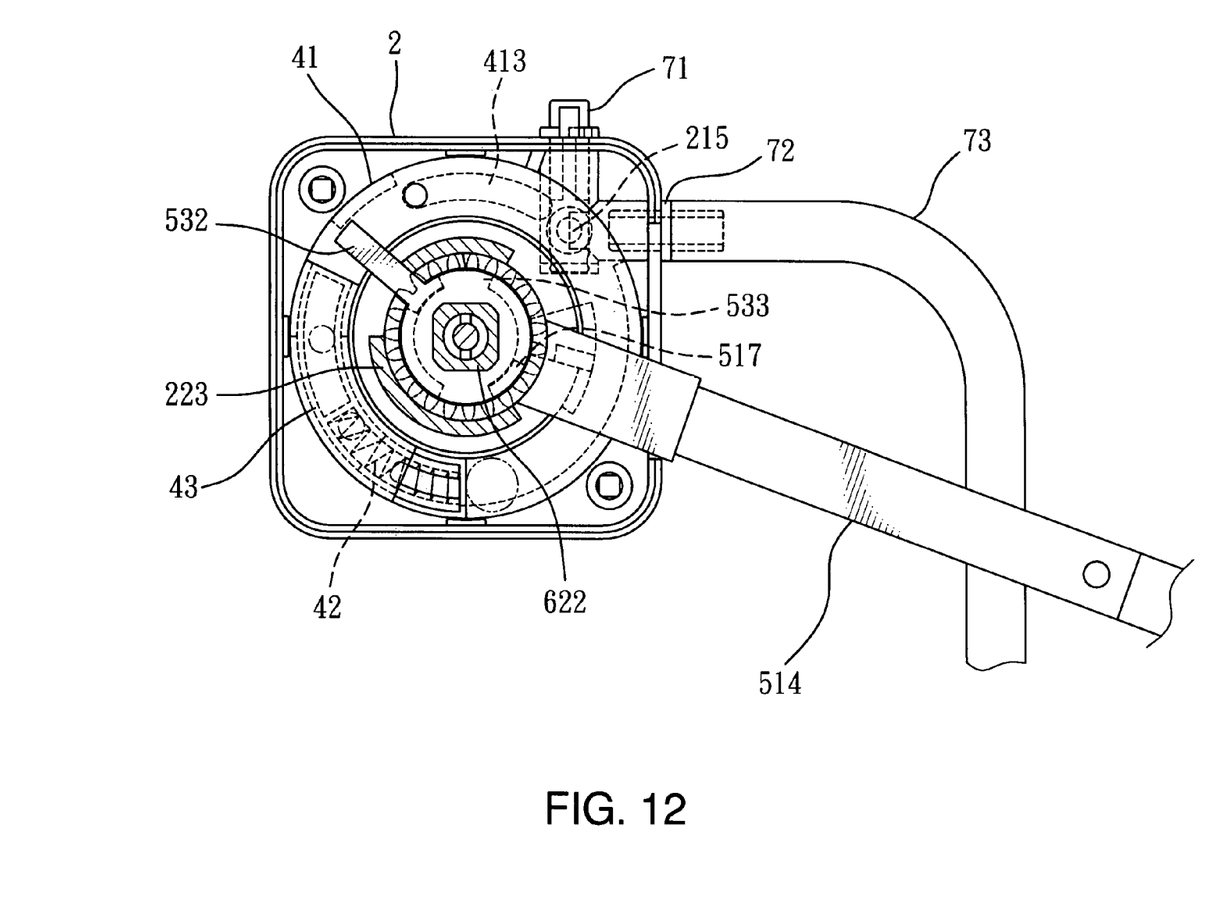
FIG. 12 is the first II-II sectional view according to the present invention.
Figure 13:
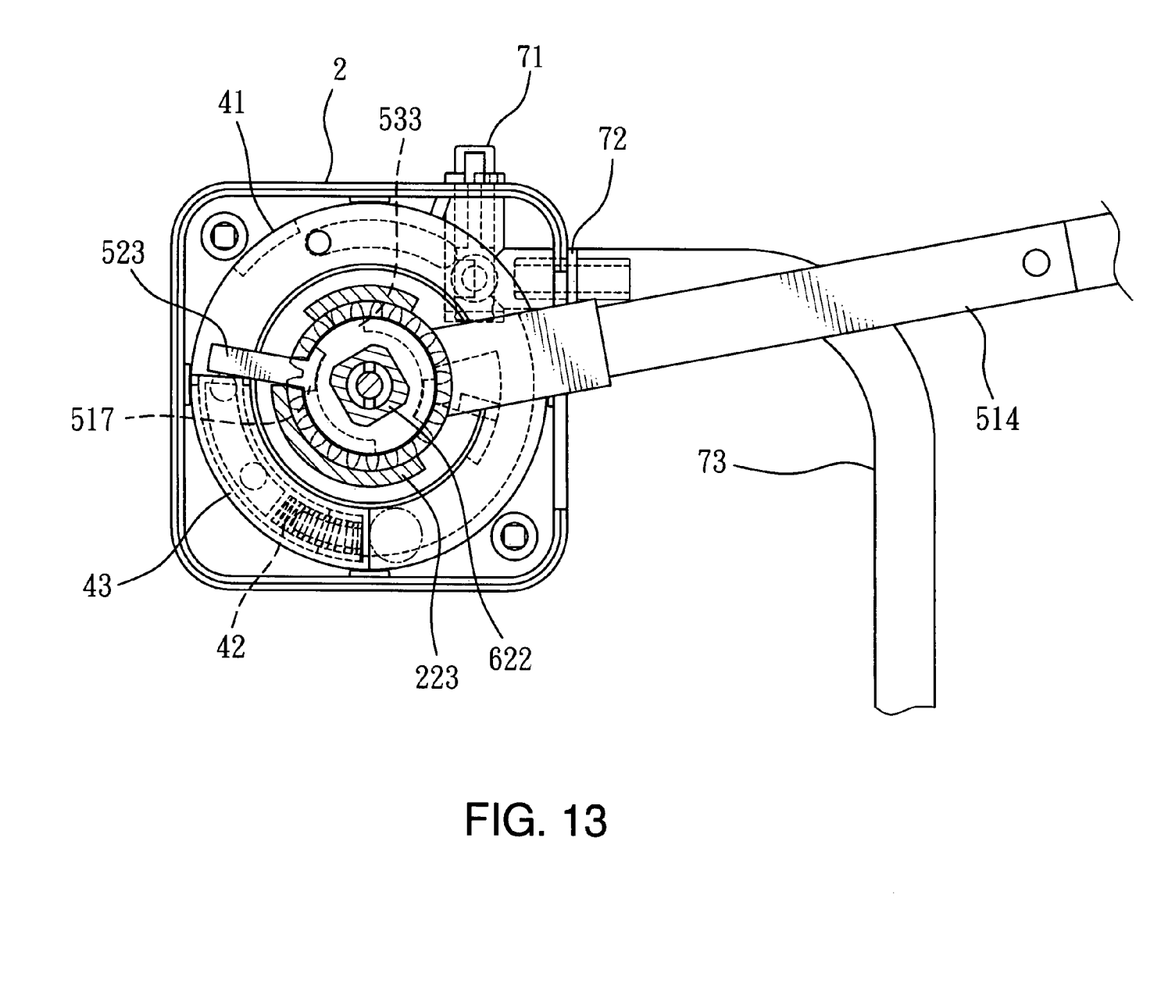
FIG. 13 is the second II-II sectional view according to the present invention.

With reference to FIG. 11, when flushing stool, the user should press the second toilet flushing handle 62. As the second toilet flushing handle 62 is pressed downwards, the second rod body 622 links up with the stop seat 53 and drives it to rotate, the third convex rib 533 of the stop seat 53 fits with the first convex rib 517 to rotate the connecting rod head 51 in order to allow the connecting rod 514 to lift the valve body 93. Since there is no buffer therewithin, the discharged water amount is larger. Further, during the handle-pressing process, the stop piece 532 pushes the arc-shaped pushing seat 43 to drive it to slide along the arc-shaped chamber 411 of the ring disk body 41; by the buffer of the spring 42, the lifting angle of the connecting rod 514 is bigger and thereby extending the water discharging time.

Figure 14:
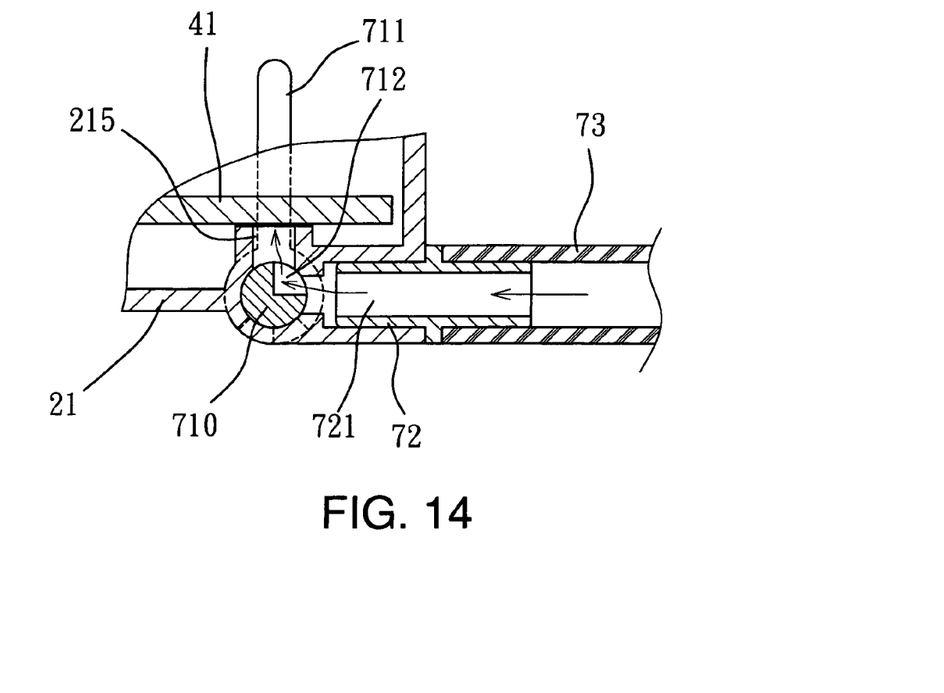
FIG. 14 is the first schematic representation of ventilation set actuation according to the present invention.
Figure 15:
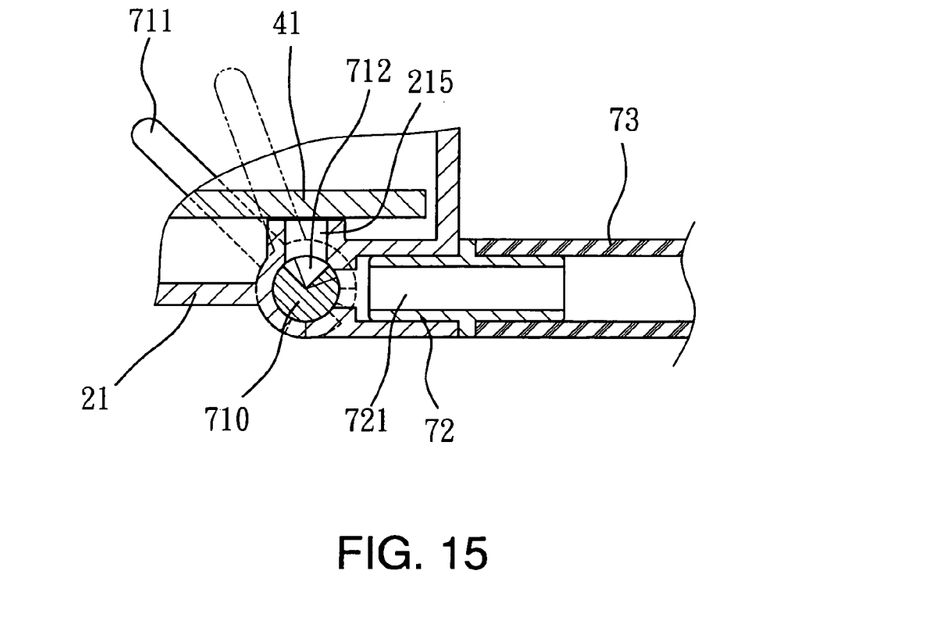
FIG. 15 is the second schematic representation of ventilation set actuation according to the present invention.

The ventilation set 7 of the dual-flush toilet device A adjusts the speed of the valve body 93 covering the flush valve 92; it controls the discharged water amount by controlling the amount of air flowing in and out. The covering is faster when the air amount is larger, and the discharged water amount is therefore smaller; and the covering is slower when the air amount is smaller, and the discharged water amount is therefore larger. As illustrated in FIG. 14, as the control valve 71 is of an open position, the air amount is larger, the covering time of the valve body 93 is shorter, and the discharged water amount is therefore smaller. As illustrated in FIG. 15, as the control valve 71 is of a closed position, the air amount is smaller or even without the airflow, the covering time of the valve body 93 is longer since the covering relies on only the water, and the discharged water amount is therefore larger.

Figure 16:
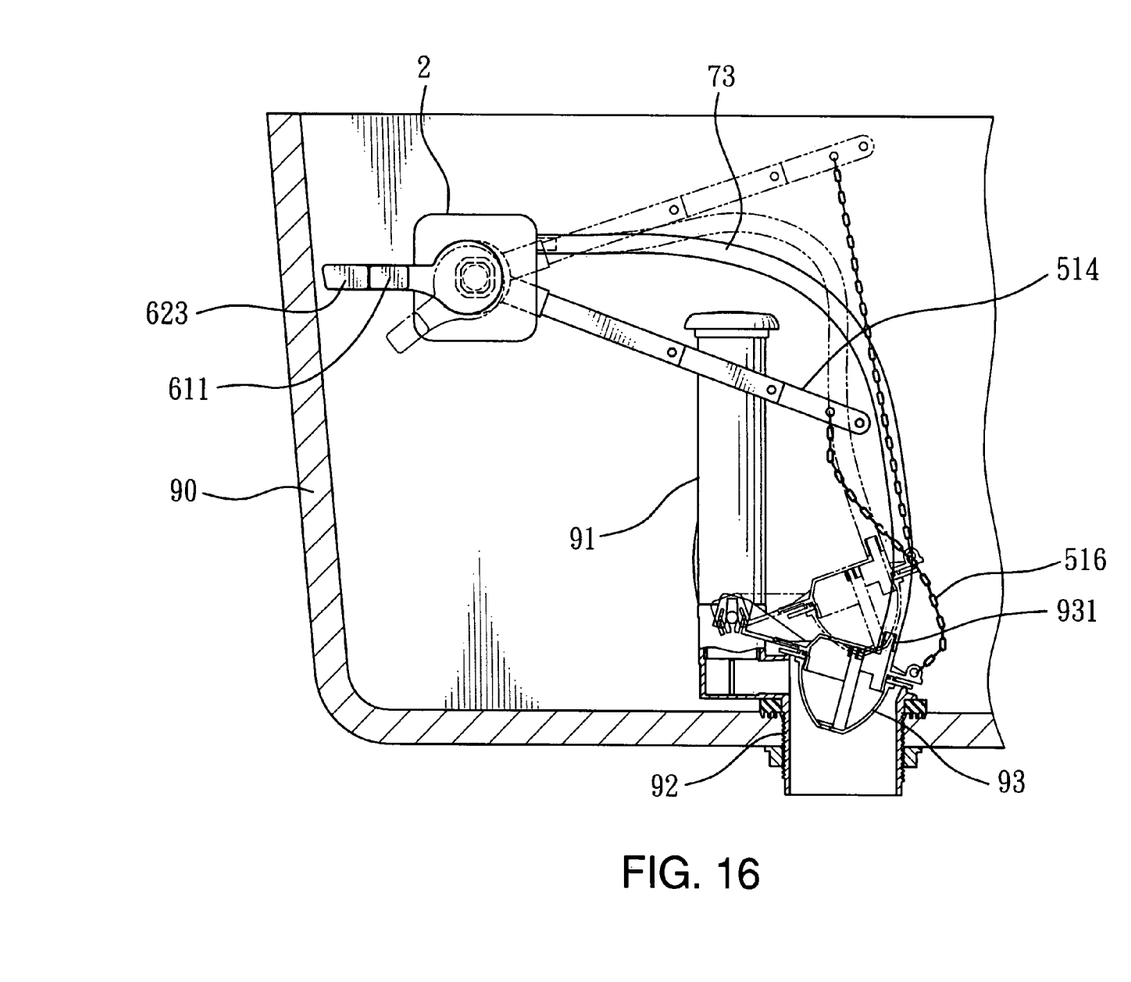
FIG. 16 illustrates another embodiment according to the present invention.
Figure 17:
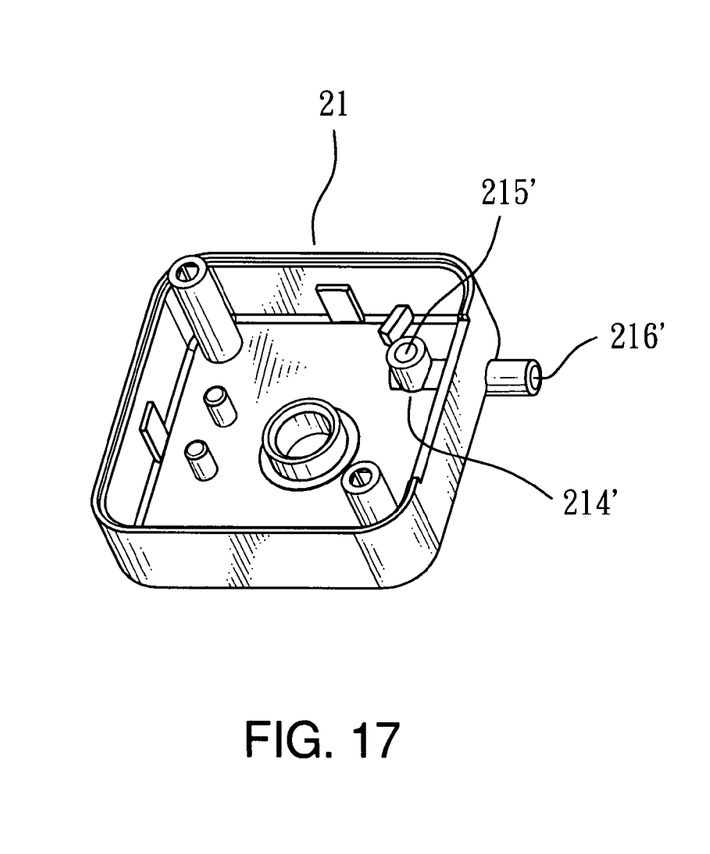
FIG. 17 is a perspective view of the first casing body of the other embodiment according to the present invention.
Figure 18:
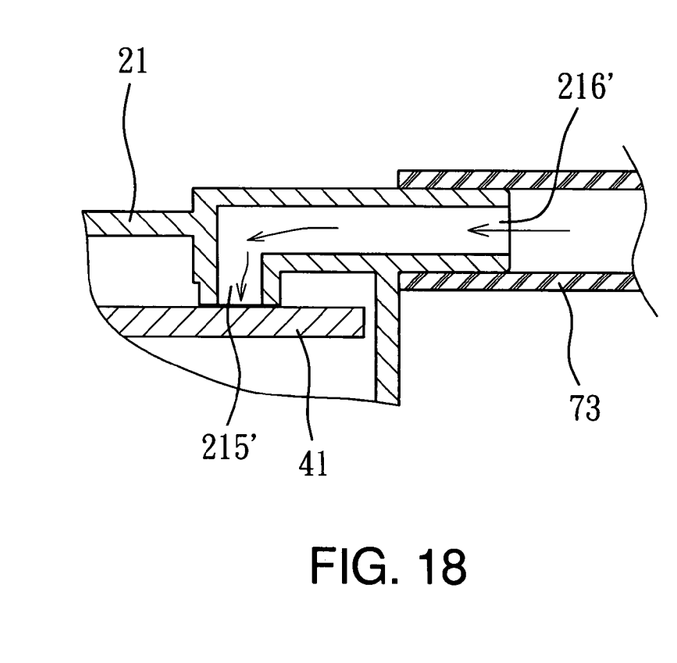
FIG. 18 is schematic representation of ventilation set actuation of the other embodiment according to the present invention.

Please refer to FIG. 16, another embodiment of the dual-flush toilet device A according to the present invention. Further with reference of FIGS. 17 and 18, wherein the air cell 214' of the ventilation set 7 is not of the control valve design. The ventilation set 7 thereof comprises a third through hole 215' and a fourth through hole 216', wherein the fourth through hole 216' is connected to the air duct 73 to form an easier structure that allows the air flow to exit as the valve body 93 covers up.

As the foregoing, the present invention provides the dual-flush toilet device that is capable of controlling water discharge amount and saving water thereof and is commonly applicable to all kinds of toilet cisterns.

While the invention has been described with reference to a preferred embodiment thereof, it is to be understood that modifications or variations may be easily made without departing from the spirit of this invention, which is defined in the appended claims.

I claim:

1. A dual-flush toilet device comprising:
an outer casing comprised of a first casing body and a second casing body, wherein the first casing body has a receiving space and a first axle hole penetrates the center of the first casing body thereof; the second casing body is disposed of a second axle hole at the inner surface thereof;
a gear set comprising a first gear, a second gear, a third gear and a fourth gear;
a ring disk set comprising a ring disk body, a spring and an arc-shaped pushing seat, wherein the ring disk body has a rounded hole at the center thereof and a plurality of supporting pieces are disposed along the periphery edge of the ring disk body; an arc-shaped chamber is provided at the top surface of the ring disk body, wherein a fixing column is convexly disposed at one side of the arc-shaped chamber and fits with the spring; the arc-shaped pushing seat is disposed inside the arc-shaped chamber and pushed by the spring;
a connecting rod set comprising:
a connecting rod head comprising a connecting rod extending from the periphery edge of a rounded main body, wherein the rounded main body comprises a fourth axle hole and a notch, and at least one first convex rib is disposed on the inner wall of the fourth axle hole;
a driving wheel having a gear part disposed at one side and a rounded body disposed at the other side thereof, wherein at least one second convex rib is provided along the periphery edge of the rounded body; and
a stop seat having a stop piece and at least one third convex rib are disposed along the periphery edge thereof;
a drive set comprising:
a first toilet flushing handle, wherein a handle body extends from the periphery edge of a plate body, and a first rod body extends from the center of the plate body;
a second toilet flushing handle, wherein a handle body extends from the periphery edge of a plate body and an axle hole penetrates the center of the plate body thereof to allow the insertion of the first rod body; a second rod body extends from the outer wall of the axle hole of one side of the plate body;
a fixing axle cover having an axle hole penetrating the center thereof to allow insertion of the second rod body; one side of the fixing axle cover provides a cylinder and another side of the fixing axle cover has an external thread section;
a drive rod having an external thread section at one end thereof and the other end of the drive rod inks to the first rod body;
a cistern fixing nut screw locked to the external thread section of the fixing axle cover; and
a fixing rotate screw having an inner thread hole to allow screw locking with the external thread section of the drive rod.

2. The dual-flush toilet device as defined in claim 1, wherein the outer casing further comprises a ventilation set; the ventilation set comprises an air cell disposed in the first casing body, a control valve, a connecting base and an air duct.

3. The dual-flush toilet device as defined in claim 1, wherein at least one arc-shaped retaining wall is disposed to surround the outer edge of the second axle hole.

4. The dual-flush toilet device as defined in claim 1, wherein one of the lateral surface of the second casing body periphery edge is disposed of a notch.

5. The dual-flush toilet device as defined in claim 1, wherein an arc-shaped groove having an air hole is disposed at the bottom lateral surface of the ring disk body.

6. The dual-flush toilet device as defined in claim 1, wherein the stop seat has a polygon hole.

7. The dual-flush toilet device as defined in claim 1, wherein an arc-shaped groove is disposed near the axle hole on the plate body of the second toilet flushing handle.

8. The dual-flush toilet device as defined in claim 1, wherein a position-limiting column is disposed at one side of the cylinder of the fixing axle cover.

9. The dual-flush toilet device as defined in claim 1, wherein the middle section of the drive rod is a polygon rod body.

* * * * *